UNITED STATES PATENT OFFICE.

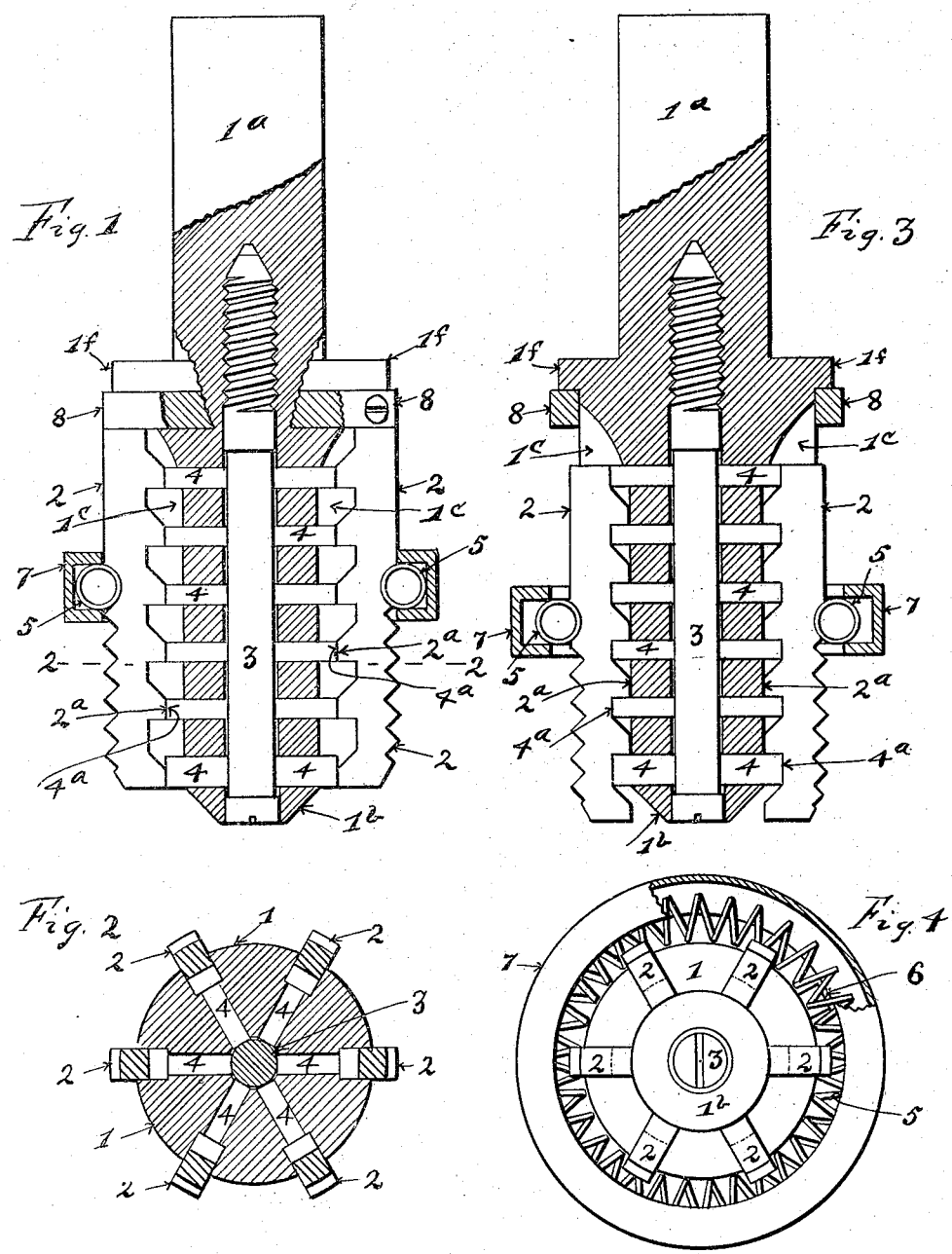

FRANKLIN A. ERRINGTON, OF STAPLETON, NEW YORK.

COLLAPSING TAP AND SIMILAR TOOL.

1,200,180.  Specification of Letters Patent.  Patented Oct. 3, 1916.

Application filed February 12, 1914. Serial No. 818,283.

*To all whom it may concern:*

Be it known that I, FRANKLIN ALFRED ERRINGTON, a citizen of the United States, residing at Stapleton, in the county of Richmond and State of New York, have invented certain new and useful Improvements in Collapsing Taps and Similar Tools, of which the following is a specification.

My invention relates broadly to interchangeable means of rigidly determining the cutting diameter of a tap or similar tool, as distinguished from instable, adjustable means of varying the cutting diameter thereof; and the principal object of my invention is to provide a simple means of collapsing a plurality of screw-cutting chasers by utilizing the spiral coaction of the screw-threads during the cutting operation of the teeth of the chasers with the threads thereby cut in the work in such a manner as to move longitudinally of the supporting body either the chasers or the means that determine their cutting diameter, and thereby collapsing the chasers so that the tap can be withdrawn from the work without stopping or reversing the direction of rotation of the driving means; and my invention further consists in the novel details of improvement that will be more fully hereinafter set forth and then pointed out in the claims.

Reference is to be had to the accompanying drawings, forming a part thereof, wherein:—

Figure 1 represents a vertical cross-section of a device embodying my invention, the parts being shown in the cutting position of the jaws; Fig. 2 is a horizontal cross-section of Fig. 1 on the line 2—2, showing the transverse arrangement of the parts in the cutting position; Fig. 3 is a similar view to Fig. 1, except that the parts are shown in the collapsed position; and Fig. 4 is a plan view of the cutting end of the device, showing the jaws in the collapsed position.

Similar numerals and letters of reference indicate corresponding parts in the several views.

A body 1 is shown provided at its rear or inner end with a shank $1^a$ for connection with suitable driving means, at the outer end the periphery of the body is indented by a multiplicity of longitudinal grooves $1^c$, adapted to receive jaws or chasers 2. The body 1 is preferably provided with an axial bore $1^d$, and intercommunication between the axial bore $1^d$ and grooves $1^c$ is preferably attained by piercing the bottom surfaces of the grooves $1^c$ by a longitudinal series of transverse bores $1^e$. A sizing core 3 is centrally located in axial bore $1^d$ preferably by its inner end being screw-threaded to mesh with corresponding screw-threads provided at the inner end of axial bore $1^d$, portions at either end of the core 3 being closely fitted to the walls of bore $1^d$, while the middle portion of the core 3, where it opposes the transverse bores $1^e$, may be reduced in size according to the cutting diameter determined upon for the jaws 2. The outer end of core 3 is shown screw-slotted for the ready clamping of the core in place, or removing the core from the body 1; and the inner end of the core is preferably beveled, for a purpose hereinafter described. Between the core 3 and independent of jaws 2 I have interposed a longitudinal series of thrust-blocks 4, located in the transverse bores $1^e$, the outer ends of the thrust-blocks 4 extending outwardly beyond the bottom surfaces of the longitudinal grooves $1^c$, to provide therein a longitudinal series of projections with indentures therebetween, the outer end surfaces of the thrust-blocks 4 providing external thrust-faces $4^a$ adapted to bear upon a corresponding longitudinal series of projections and indentures provided on the under or inner surface of the jaws 2 the inner surfaces of the jaw-projections providing internal thrust-faces $2^a$ adapted to bear upon the external thrust-faces $4^a$ when the jaws are in the cutting position (see Fig. 1 and Fig. 2.)

The jaws 2 are preferably held in their respective grooves $1^c$ concentrically of body 1 by a spiral band-spring 5, the ends of which are joined together; and the jaws 2 are shown provided with a spring-groove $2^b$, extending across the outer surface of the jaws. The jaws 2 are sufficiently extended beyond the periphery of body 1 to permit the retaining-spring 5 to exert a concentric pressure upon them, even when in the collapsed position. An abutment or pin 6 is provided (see Fig. 4) for the spring 5 to slip over and thereby hold the jaws in the cutting position; and I believe it is preferable to provide a multiplicity of these abutments 6 to insure holding the spring 5 and by it the jaws 2 evenly in the cutting position. To protect spring 5 and also to facilitate the closing of jaws 2 I have shown the spring 5 surrounded by a closing-ring 7.

To facilitate the manufacture of the device and to provide a true surface for all the jaws 2 to abut against when presented against the work, I have preferably slipped a hardened ring 8 over the body 1, said ring abutting against a shoulder $1^f$ provided on body 1 for that purpose. The jaws 2 are then slipped into their respective grooves $1^c$, the rear surfaces of the jaw-projections being preferably beveled to run up over the projecting ends of the thrust-blocks 4 as said jaws are pushed inwardly of body 1 along said grooves $1^c$; and the front surfaces of the jaw-projections are shown extending at right angles to the axis of body 1, to catch against the projecting thrust-blocks 4 when the jaws 2 have moved forward to the collapsed position (see Fig. 3.) The spring 5 (within its ring 7) is preferably slipped over the jaws 2 while they are in the collapsed position shown in Fig. 3, the spring 5 passing over the screw-threaded portions of the jaws until said spring meshes with the grooves $2^b$ provided in the jaws to receive it.

To bring the parts into the cutting position shown in Fig. 1, the operator pushes the ring 7 inwardly along body 1, and with it the spring 5 and jaws 2, the sloping sides of the jaw-projections ascending the thrust-blocks 4, until the internal thrust-faces $2^a$ of the jaws slide into line, transversely of body 1, with the external thrust-faces of blocks 4, said thrust-faces continuing to increase their bearing upon each other until the rear ends of the jaws abut against the thrust-ring 8, whereupon the spring 5 shall have slipped over abutment 6, thereby locking the parts in the cutting position shown in Figs. 1 and 2.

When it is desired to change the cutting diameter of jaws 2, the core 3 can be removed and a smaller or a larger core put in its place, the inner end of the core 3 being beveled to push the thrust-blocks 4 radially outward as the core 3 is pushed along the bore $1^d$ into its proper position, where it is immovably clamped by the screw-threads in said bore and on said core for that purpose. Should the biggest core 3 admissible into bore $1^d$ still leave the cutting diameter of the jaws 2 too small for the work contemplated, the thrust-blocks 4 can be changed for longer ones; or even if the axial bore $1^d$ and its core 3 were omitted, the diameter of the jaws could be changed by a corresponding change in the projection of the thrust-blocks 4 above the bottom surfaces of the grooves $1^c$ by a corresponding change in the size of the thrust-blocks 4.

When applying my invention to a collapsing tap having its jaws or chasers 2 externally screw-threaded as shown in the drawings, upon the rotation of either the device or of a suitable piece of work having a suitable aperture to be tapped, the chasers 2 will cut screw-threads into the walls of said aperture in the work upon the presentation of the device thereagainst, and the position of the chasers 2 relatively to body 1 will remain constant until the relative movement of the device and the work toward each other is stopped by any suitable means,—as, for instance, by using the outer end $1^b$ of the body as a stop to encounter the bottom surface of the aperture being threaded, whereupon the continued rotation of the rotative member (either body 1 or the work being operated upon) will cause the chasers 2 to continue cutting, while at the same time the screw-threads of the chasers 2 will draw the chasers 2 longitudinally of body 1 during the cutting operation independently of the thrust-blocks 4 by the spiral coaction of the screw-threads of the chasers with the threads already cut in the work until the internal thrust-faces $2^a$ of the chasers 2 pass out of line transversely of body 1 with the external thrust-faces $4^a$ of the thrust-blocks 4, whereupon the jaws 2 will slide inwardly radially of body 1, the projections $2^a$ of the chasers passing within the plane of their respective associate external thrust-faces $4^a$ into the indentures therebetween, and this inward radial movement of the chasers continues during the collapsing operation until the cutting teeth clear the threaded walls of the aperture in the work, whereupon the device can be withdrawn from the threaded aperture without stopping or reversing the direction of rotation of the rotative member.

Having now described my invention, what I claim is:—

1. The combination of a body having a plurality of longitudinal grooves in its periphery and cutting jaws located in said grooves the bottom surfaces of the grooves being indented by a longitudinal series of transverse bores to receive a corresponding series of thrust-blocks located under and independent of the jaws and projecting outwardly beyond the bottom surfaces of the grooves, thereby providing therein a longitudinal series of external thrust-faces with indentures therebetween, the inner surfaces of the jaws being provided with a corresponding longitudinal series of projections with indentures therebetween, the inner surfaces of said jaw-projections providing internal thrust-faces during the cutting opternal thrust faces during the cutting operation, said jaws being movable longitudinally of the body independently of said thrust-blocks during the cutting operation to bring said internal and external thrust-faces out of line with each other to collapse the jaws, substantially as described.

2. The combination with a body having a plurality of longitudinal grooves in its periphery, the bottoms of said grooves being pierced by a longitudinal series of bores extending transversely of the body, thrust-blocks located in said bores, a sizing-core centrally located in said body, screw-cutting jaws located in said grooves, said core and said jaws being movable the one longitudinally of the other during the cutting operation, the longitudinally movable member being provided with a series of projections and indentures to coact with said thrust-blocks to collapse said jaws, substantially as described.

3. The combination with a body having a plurality of longitudinal grooves in its periphery and cutting jaws located therein, the bottoms of said grooves being pierced by a series of bores extending transversely of the body to afford intercommunication between said grooves, of a longitudinal series of thrust-blocks located in said transverse bores between said jaws, the outer ends of said thrust-blocks extending outwardly beyond the bottom surfaces of said grooves, thereby providing therein a longitudinal series of external thrust-faces with indentures therebetween, the inner surfaces of the jaws being provided with a corresponding longitudinal series of projections with indentures therebetween, the inner surfaces of said jaw-projections providing internal thrust-faces that bear upon said external thrust-faces during the cutting operation, said jaws being movable longitudinally of the body independently of said thrust-blocks during the cutting operation to bring said internal and external thrust-faces out of line with each other to collapse the jaws, substantially as described.

FRANKLIN A. ERRINGTON.

Witnesses:
F. J. GOODRICK,
A. C. STOCK.

Copies of this patent may be obtained for five cents each, by addressing the "Commissioner of Patents, Washington, D. C."